Figure 1:
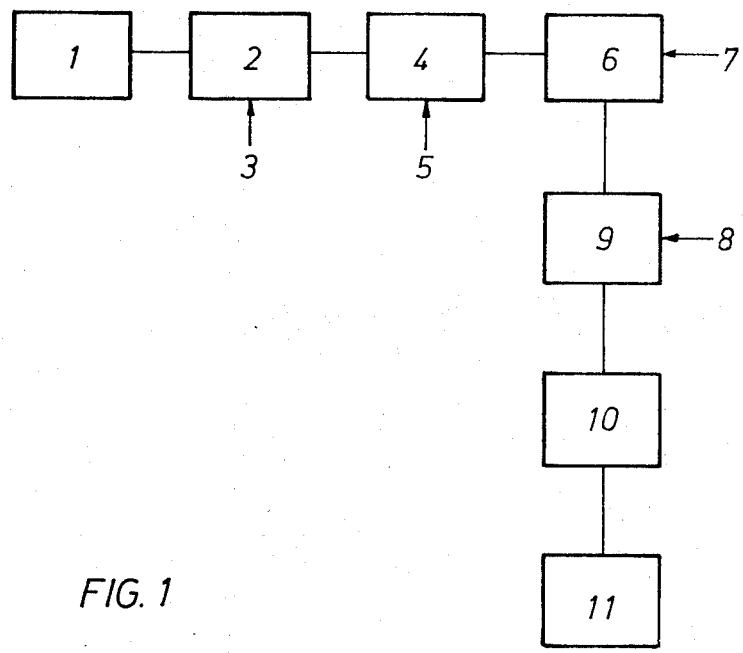

United States Patent [19]
Weiler et al.

[11] 3,981,978
[45] Sept. 21, 1976

[54] WORKING UP AQUEOUS TITANIUM DIOXIDE HYDRATE SUSPENSIONS

[75] Inventors: Raoul Weiler, Berchem; Henri Uwents, Ekeren, both of Belgium

[73] Assignee: Bayer Antwerpen N.V., Antwerp, Belgium

[22] Filed: May 14, 1975

[21] Appl. No.: 577,492

[30] Foreign Application Priority Data
May 17, 1974 Germany............................ 2423983

[52] U.S. Cl................................ 423/610; 423/615; 423/616
[51] Int. Cl.² ................. C01G 23/04; C01G 23/06; C01G 23/08
[58] Field of Search..................... 423/610, 615, 616

[56] References Cited
UNITED STATES PATENTS
2,148,283    2/1939    Washburn....................... 423/610 X FOREIGN PATENTS OR APPLICATIONS
1,422,120    11/1965    France OTHER PUBLICATIONS
"Hackh's Chemical Dictionary," by J. Grant, 4th Ed., 1969, p. 77, McGraw-Hill Book Co., N.Y.
"Titanium," J. Barksdale, 2nd Ed., 1966, pp. 317–323, The Ronald Press Co., N.Y.
"Industrial Filtration of Liquids," 2nd Ed., 1971, pp. 278–279, by D. B. Purchas, Leonard Hill Books, London.

*Primary Examiner*—Edward Stern
*Attorney, Agent, or Firm*—Burgess, Dinklage & Sprung

[57] ABSTRACT

In the recovery of titanium dioxide by subjecting an aqueous titanium dioxide hydrate suspension to at least one stage of filtering and washing to form a washed filter cake, adjusting the composition and calcining the adjusted and washed filter cake, the improvement which comprises filtering the aqueous titanium dioxide hydrate suspension under a pressure of about 1 bar to 16 bars to form a homogeneous substantially crack-free filter cake of a thickness of about 10 to 25 mm. Advantageously a membrane filter is employed, and washing is effected under a pressure of 1 to 16 bars and a liquid flow rate of 0.1 to 1 m/h to produce a filter cake having a solids content of at least 45 % by weight.

3 Claims, 1 Drawing Figure

WORKING UP AQUEOUS TITANIUM DIOXIDE HYDRATE SUSPENSIONS

It is known that $TiO_2$ can be removed from ilmenite ores or titanium slags by disintegration with sulfuric acid. Hydrolysis of the titanyl sulfate formed yields titanium dioxide hydrate which is after separation from the mother liquid (diluted sulfuric acid) calcined and ground. The titanium dioxide hydrate which accumulates during hydrolysis is in the form of very fine particles and, in addition, generally contains foreign substances in such quantities that it cannot be subjected to calcination without additional purification stages. Precipitated titanium dioxide hydrate is fairly difficult to filter on account of its compressibility and fine particle size. In order to separate the impurities from the filtered titanium dioxide hydrate, it is common practice to resuspend the filter cake, optionally in the presence of special additives, and to refilter the resulting suspension. These washing filtration stages may be repeated is desired (Titanium J. Barksdale, Second Edition, pages 317 et seq.).

The titanium dioxide hydrate which accumulates during hydrolysis from the sulfuric acid titanyl sulfate solution, which generally contains iron and other impurities, is normally separated from the diluted sulfuric acid with so-called Moore filters. Moore filters are particularly suitable for slow filtration and operate under vacuum. They also enable the filter cake to be washed out. More information on Moore filters may be found, for example, in D. B. Purchas, Industrial Filtration of Liquids, Sec. Edition, Leonard Hill Books, pages 278 to 279.

A commonly used process will be described with reference to the accompanying drawing wherein the FIGURE is a flow sheet of the process.

Referring now more particularly to the drawing, in a hydrolysis stage 1, an iron-containing solution of titanyl sulfate in sulfuric acid is hydrolyzed at a temperature in the range from 80° to 120°C. In a first filtration stage 2, the formed titanium dioxide hydrate is separated from the diluted sulfuric acid on a Moore filter, after which the filter cake may be treated with washing water 3 on the filter. In cases where ilmenite is used as raw material, the filter cake initially contains some 40 % by weight of iron (expressed as $Fe_2O_3$, based on solid $TiO_2$) and, where slag is used as the raw material, the filter cake contains some 25 % by weight of iron. The iron content can be reduced to around 0.1 % by weight of iron by a washing process. After filtration and, optionally, washing, the cake is thrown off manually suspended in water and subjected to bleaching 4 (for example adding 5 aluminum and $H_2SO_4$ at 80°C). The bleached suspension is refiltered on a Moore filter 6 and normally treated with washing water 7 until the iron content of the filter cake has fallen to less than 40 ppm of $Fe_2O_3$. This filter cake is again thrown off manually and resuspended to form a slurry. By adding different chemicals at 8, it is possible to make an adjustment 9 which will specifically influence the properties of the pigment in the calcining furnace. The adjusted titanium dioxide hydrate suspension is then concentrated by means of a rotary drum filter 10 to a solid content of about 38 % by weight (based on $TiO_2$) and calcined in a calcination furnace 11 at about 600°C to 1200°C to form the $TiO_2$ clinker in anatase or rutile form.

It is known according to the French Pat. specification No. 1,422,120 that, following the hydrolysis, the titanium dioxide hydrate can be separated on a Moore filter or a rotary drum filter and the filter cake can be treated on the filter with various washing liquids. The iron content may be reduced to levels of 40 ppm and less by adding washing liquid containing titanium (III) ions. After suitable adjustment for calcination, the filter cake may then be directly introduced into the calcining furnace.

The particular disadvantages of these processes are that both filtration and the various washing stages are very time-consuming, and that the filter cakes have low solid contents from 35 to 40 % by weight of $TiO_2$. Therefore large thermal energy quantities are necessary for the evaporation in the calcination process.

It is accordingly an object of the invention to provide a rapid, economical process for producing titanium dioxide pigments from aqueous titanium dioxide hydrate suspensions.

This object is realized by an improvement in the conventional recovery process in which such a suspension is subjected to at least one stage of filtration and washing to form a washed filter cake, the cake composition is adjusted and it is then calcined. In accordance with the improvement, the filtration of the suspension is effected under a pressure of about 1 bar to 16 bars to form a homogeneous substantially crack-free filter cake of a thickness of about 10 to 25 mm.

The process according to the invention, in contrast to conventional processes carries out filtration under pressure rather than under vacuum. Nonetheless, it is surprisingly possible to filter the titanium dioxide hydrate more quickly than before in spite of its particle fineness and filter cake compressibility. In addition, the solid content of the filter cake may readily be increased to values from 45 to 55 % by weight. A membrane filter, for example of the type illustrated on page 225 and described on pages 223 and 227 of "Industrial Filtration of Liquids", D. B. Purchas, Sec. Edition, Leonard Hill Books, is particularly suitable for carrying out the process according to the invention. A filter of this kind comprises horizontal filter compartments which enable filter cakes to be obtained in any layer thickness from 10 mm to 35 mm. Filtration may be carried out under pressures of from 1 to 16 bars and preferably under pressures of about 3 to 6 bars.

In one preferred form of application according to the invention, the filtration is combined with one or more washing stages and the filter cake is treated on the filter. The filter cake may be washed under pressures from 1 to 16 bars and preferably under pressures of about 4 to 10 bars. In the process illustrated in the drawing, the filtration stages which are carried out using a Moore filter or rotary drum filter may also be carried out using a membrane filter. In the preferred form of application according to the invention, two successive filtration stages or all the filtration stages which are necessary in the process illustrated in the flow sheet, are combined into one stage. The titanium dioxide hydrate hydrolysis sludge present in homogeneous and substantially crack-free form may be washed out by passing the washing liquids through the filter cake at flow rates of about 0.1 to 1 m/h and preferably at flow rates of about 0.3 to 0.7 m/h. Titanium (III) may be added to the washing water in concentrations of about 0.8 to 4 g of $Ti^{3+}$/liter.

By virtue of the relatively low residual moisture content with which the titanium dioxide hydrate accumulates in the process according to the invention after filtration and washing, a 25 to 30 % reduction in energy consumption and an increased throughput may be obtained in the calcination stage. In addition, the iron content may readily be adjusted to levels below 25 ppm based on solid $TiO_2$. The process stage referred to as "adjustment" in the flow sheet may also be readily carried out on the filter. To this end, the filter cake is prepared for calcination by adding the chemicals normally used in the adjustment.

The process according to the invention is illustrated in the following Examples.

EXAMPLE 1

In the process illustrated in the drawing, the rotary drum filter 10 was replaced by a membrane filter. The filtration cycle was carried out as follows:

|  | Duration |
| --- | --- |
| Filtration at 4 bars: | 2 minutes |
| Compression at 16 bars: | 3 minutes |
| Blowing dry at 4 bars: | 1 minute |
| Dead time of apparatus: | 3.5 minutes |
| Total time of filtration cycle | 9.5 minutes |

The filtration output in the case of anatase amounted to between 120 and 130 kilograms per square meter per hour for a filter surface of 2.5 m² (based on $TiO_2$). The filtration output was approximately 20 % lower in the case of rutile. The solid content amounted to approximately 50 % by weight in the case of anatase and to 48.5 % by weight in the case of rutile. The optimum filter cake thickness amounted to between 15 and 25 mm.

EXAMPLE 2

In the drawing, the Moore filter 6 and the rotary drum filter 10 wre replaced by a membrane filter. The filtration cycle went as follows:

|  | Duration |
| --- | --- |
| Filtration at 4 to 4.5 bars: | 2.5 minutes |
| Washing at 6 to 8 bars: | 10.0 minutes |
| Flow rate m/h: 0.38 |  |
| Compression at 16 bars: | 3 minutes |
| Blowing dry at 4 to 4.5 bars: | 0.5 minutes |
| Dead time of apparatus: | 3.5 minutes |
| Total time of filtration cycle | 19.5 minutes |

The filter cake was not compressed between the filtration and washing steps. The filtration output in the case of anatase amounted to 44.2 kilograms per square meter and hour. It was about 20 % lower in the case of rutile. The optimum cake thickness amounted to between 15 and 25 mm. The cake has an Fe-content of 20 ppm and the same solid content as in Example 1.

EXAMPLE 3

After hydrolysis, filtration was carried out in a single stage in a membrane filter. The starting suspension had an iron content of 22 % by weight expressed as $Fe_2O_3$ on solid $TiO_2$. The filtration cycle was carried out as follows:

|  | Duration |
| --- | --- |
| Filtration at 6 bars: | 10 minutes |
| Washing I (water) at 6 bars: | 10 minutes |
| Flow rate m/h: 0.56 |  |
| Intermediate compression at 6 bars: | 4 minutes |
| Washing II (water + $Ti^{3+}$) at 6 bars: | 46 minutes |
| Flow rate m/h: 0.25 |  |
| Compression at 16 bars: | 3 minutes |
| Blowing dry at 4 bars: | 1 minute |
| Dead time of the apparatus: | 3.5 minutes |
| Total time of filtration cycle | 77.5 minutes |

The filtration output in the case of rutile amounted to 8 kilogram per square meter and hour for a filter surface of 2.5 m², and in the case of anatase to between 10 and 15 kilogram per square meter and hour. In the second washing stage (washing II) a concentration of 1.6 g of $Ti^{3+}$/liter was adjusted in the washing water. The total quantity of $Ti^{3+}$ added amounted to 40 g. The iron content of the filter cake after blowing dry amounted to 25 ppm based on solid $TiO_2$ and the solid content to 50 %. The optimum cake thickness was between 15 and 25 mm.

It will be appreciated that the instant specification and examples are set forth by way of illustration and not limitation, and that various modifications and changes may be made without departing from the spirit and scope of the present invention.

What is claimed is:

1. In the recovery of titanium dioxide by subjecting an aqueous titanium dioxide hydrate suspension to at least one stage of filtering to form a filter cake, adjusting the composition and calcining the adjusted filter cake, the improvement which comprises pressure filtering the aqueous titanium dioxide hydrate suspension in a membrane filter under a pressure of 3 bars to 16 bars to form a homogeneous substantially crack-free filter cake of a thickness of about 10 to 25 mm, and pressure washing the filter cake with liquid flowing at a rate of 0.1 to 1 m/h under a pressure of 1 bar to 16 bars with water containing 0.8 to 4 g of $Ti^{3+}$/liter.

2. The process of claim 1, wherein the washed filter cake has a solid content of at least about 45 % by weight.

3. The process of claim 2, wherein pressure filtration is effected under a pressure of 3 to 6 bars and pressure washing is effected at a liquid flow rate of 0.3 to 0.7 m/h under a pressure of 4 to 10 bars.

* * * * *